(12) United States Patent
Lee et al.

(10) Patent No.: US 12,476,533 B2
(45) Date of Patent: Nov. 18, 2025

(54) POWER SUPPLIES WITH MULTIPLE OUTPUT PORTS, AND CONTROL METHODS THEREOF

(71) Applicant: Leadtrend Technology Corporation, Zhubei (TW)

(72) Inventors: Hung-Ching Lee, Zhubei (TW); Ming-Chang Tsou, Zhubei (TW); Hsien-Te Huang, Zhubei (TW); Shih Yi Yang, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 658 days.

(21) Appl. No.: 17/724,077

(22) Filed: Apr. 19, 2022

(65) Prior Publication Data

US 2023/0014541 A1    Jan. 19, 2023

(30) Foreign Application Priority Data

Jul. 19, 2021    (TW) .................................. 110126463

(51) Int. Cl.
*H02M 1/00*    (2007.01)
*H02J 7/00*    (2006.01)
*H02M 7/02*    (2006.01)

(52) U.S. Cl.
CPC ......... *H02M 1/007* (2021.05); *H02J 7/00036* (2020.01); *H02J 7/0013* (2013.01); *H02M 7/02* (2013.01); *H02J 2207/20* (2020.01); *H02J 2207/30* (2020.01)

(58) Field of Classification Search
CPC ...... H02M 1/007; H02M 3/1584; H02M 7/02; H02M 7/12; H02J 7/00036; H02J 7/0013; H02J 7/007184
See application file for complete search history.

(56) References Cited

U.S. PATENT DOCUMENTS

| | | | |
|---|---|---|---|
| 2015/0115910 A1* | 4/2015 | Jiang .................. | H02M 3/1584 323/271 |
| 2017/0310227 A1* | 10/2017 | Zhang ................. | H02M 3/1584 |
| 2020/0257345 A1* | 8/2020 | Wang .................. | G06F 13/4282 |
| 2021/0351716 A1* | 11/2021 | Richards ............... | H02J 7/0045 |

FOREIGN PATENT DOCUMENTS

TW          202030578 A    8/2020

* cited by examiner

*Primary Examiner* — Alex Torres-Rivera
(74) *Attorney, Agent, or Firm* — McClure, Qualey & Rodack, LLP

(57) ABSTRACT

A power supply has multiple DC power sources converted from an AC power source. The power supply has an isolated converter converting the AC power source into an intermediate DC power source, and non-isolated converters converting the intermediate DC power source into the DC power sources, regulated at target output values respectively. A communication channel connects the isolated converter and one of the non-isolated converters, and transmits a feedback signal in association with the target output values. The isolated converter, in response to the feedback signal, regulates the intermediate DC power source at an intermediate target value related to the target output values.

14 Claims, 6 Drawing Sheets

POWER SUPPLIES WITH MULTIPLE OUTPUT PORTS, AND CONTROL METHODS THEREOF

CROSS-REFERENCE TO RELATED APPLICATION

This application claims priority to and the benefit of Taiwan Application Series Number 110126463 filed on Jul. 19, 2021, which is incorporated by reference in their entirety.

BACKGROUND

The present disclosure relates generally to a power supply with multiple DC power sources, and more particularly, to a power supply which converts an AC power source into several DC power sources.

Almost all portable electronic apparatuses are subject to recharge, and each needs a charger that provides a power with adequate output ratings. To reduce the total numbers of chargers that consumers need to own or bring with, a charger with multiple output ports is developed, capable of charging apparatuses in parallel at the same time. For example, an alternative-current-to-direct-current (AC-to-DC) charger could be equipped with two type-A USB receptacles and two type-C USB receptacles, each in compliance with several charge protocols and capable of charging a portable electronic apparatus independently.

AC-to-DC chargers are power supplies, which are commonly demanded to have a compact size, high conversion efficiency, and a high output power. As a result, a power supply with multiple output ports needs to develop now new technologies to meet demands.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
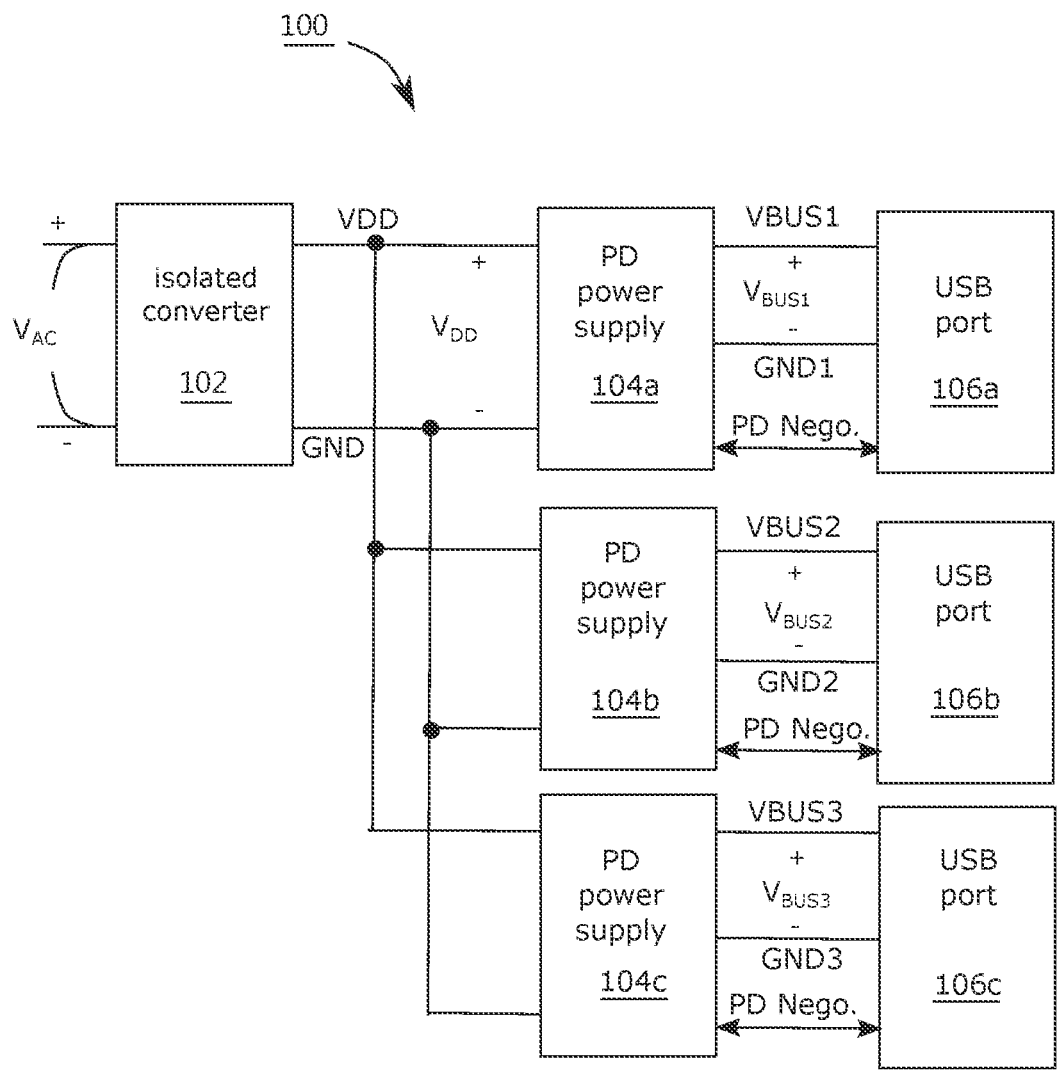
FIG. 1 demonstrates a power supply.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Chargers with multiple USB ports are exemplified as power supplies of the invention, but this invention is not limited to however. An embodiment of the invention could have an output port which is not a USB port.

An embodiment of the invention provides a power supply converting an AC power source into several DC power sources, each capable of supplying power to a load via an output port. The power supply has an isolated converter and several non-isolated converters. The isolated converter converts an AC power source into an intermediate DC power source, which is then converted by the non-isolated converters to provide the DC power sources respectively. The DC power sources are regulated at target output values, respectively. One of the non-isolated converters transmits a feedback signal via a communication channel to the isolated converter, where the feedback signal is in association with the target output values. In response to the feedback signal, the isolated converter regulates the intermediate DC power source at an intermediate target value related to the target output values.

In one example, the intermediate target value is determined based on the maximum among the target output values. In another example, the intermediate target value is determined based on the present output voltages of the DC power sources.

In some embodiments, the intermediate target value, at which the intermediate DC power source is regulated, could vary along with the change to the DC power sources. When any of target output values changes due to the request from a load, the intermediate target value could change accordingly, to increase the power conversion efficiency of the power supply.

FIG. 1 demonstrates power supply 100, including isolated converter 102, power-delivery (PD) power supplies 104a, 104b, 104c, and USB ports 106a, 106b, 106c. Isolated converter 102 converts AC power source $V_{AC}$ into intermediate DC power source $V_{DD}$ between power line VDD and ground line GND. Galvanic isolation is used between DC power source $V_{DD}$ and AC power source $V_{AC}$, meaning no direct conduction path is permitted between the two power sources. For example, isolated converter 102 could be a flyback converter or an LLC power converter.

All PD power supplies 104a, 104b and 104c are non-isolated converters. PD power supply 104a, for example, converts intermediate DC power source $V_{DD}$ into DC power source $V_{BUS1}$ between bus power line VBUS1 and bus ground line GND1, and regulates DC power source $V_{BUS1}$ at target output value $V_{TAR1}$. In other words, the voltage of DC power source $V_{BUS1}$ is controlled to be about target output value $V_{TAR1}$. Target output value $V_{TAR1}$ could be determined according to the negotiation between PD power supply 104a and a load via USB port 106a. USB PD protocol 3.0, for example, defines that target output value $V_{TAR1}$ could be configured to be 5V, 9V, 15V or 20V.

In one embodiment, each of PD power supplies 104a, 104b and 104c is a buck converter, USB ports 106a, 106b and 106c are type-C USB receptacles, and each of PD power supplies 104a, 104b and 104c can regulate its DC power source at 5V, 9V, 15 or 20V, based on negotiation result. As known in the art, a buck converter is functionable only if its input power source has an input voltage higher than the output voltage of its output source. Accordingly, isolated converter 102 is configured to regulate intermediate DC power source $V_{DD}$ at 21V for example, so PD power supplies 104a, 104b and 104c can work properly, whether target output values $V_{TAR1}$, $V_{TAR2}$ and $V_{TAR3}$ are 5V, 9V, 15V or 20V.

Nevertheless, the voltage configuration setting in FIG. 1 could cause low power conversion efficiency. In case that each target output value of DC power sources $V_{BUS1}$, $V_{BUS2}$, and $V_{BUS3}$ is 5V, converted from intermediate DC power source $V_{DD}$ at 21V for instance, power conversion efficiency would be very low due to the 16V voltage drop from intermediate DC power source $V_{DD}$ to any of the DC power sources.

Figure 2:
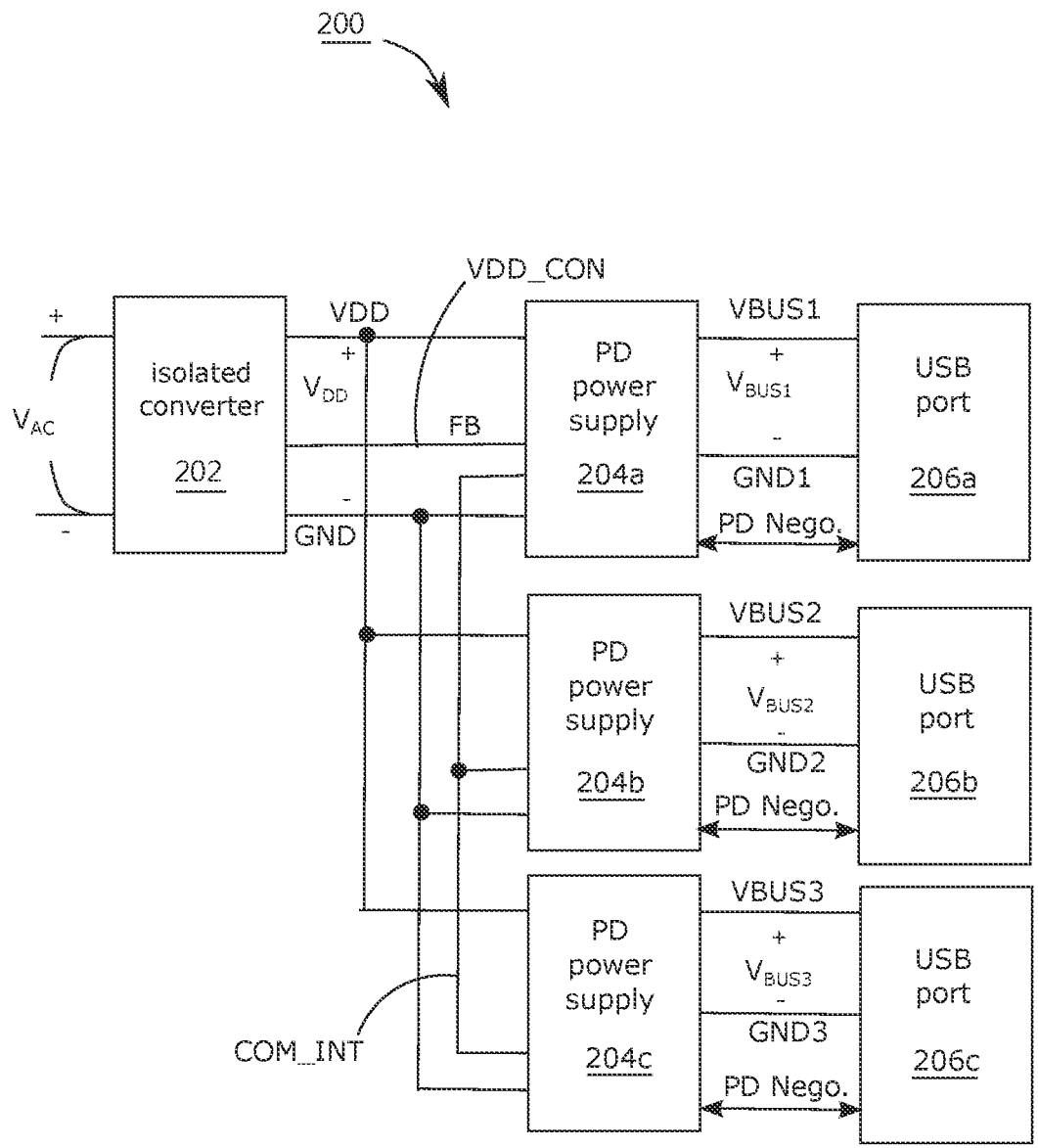
FIG. 2 demonstrates a power supply according to embodiments of the invention.
Figure 3:
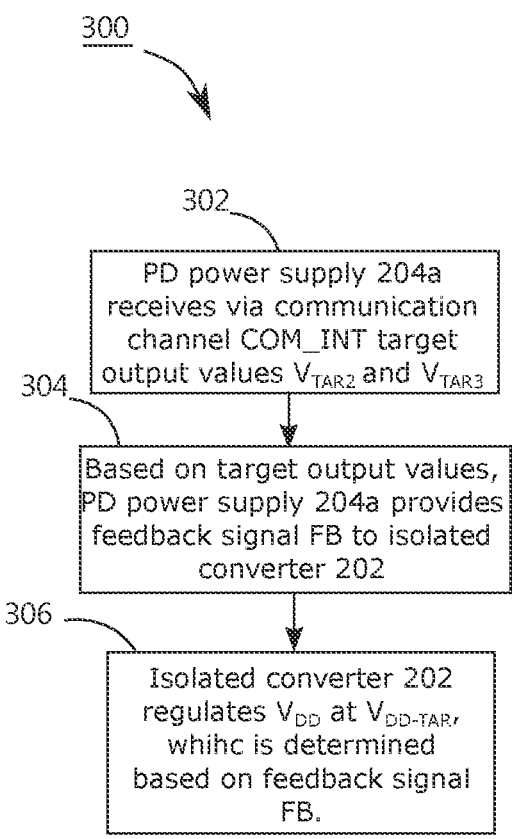
FIG. 3 shows a control method in use of the power supply in FIG. 2.

FIG. 2 demonstrates power supply 200 according to embodiments of the invention, and FIG. 3 control method 300 in use of power supply 200. Power supply 200 has isolated converter 202, PD power supplies 204a, 204b, 204c, and USB ports 206a, 206b, 206c. Isolated converter 202 converts AC power source $V_{AC}$ into intermediate DC power source $V_{DD}$ between power line VDD and ground line GND. Galvanic isolation is used between DC power source $V_{DD}$ and AC power source $V_{AC}$, and no direct conduction path is permitted to flow between DC power source $V_{DD}$ and AC power source $V_{AC}$. FIGS. 2 and 1 have the same or similar aspects, which are not detailed herein because they are comprehensible in view of the previous teaching of FIG. 1.

Different from FIG. 1, PD power supply 204a, 204b and 204c in FIG. 2 can send or transmit, via communication channel COM_INT, information regarding to at least one of target output values $V_{TAR1}$, $V_{TAR2}$ and $V_{TAR3}$. For example, as demonstrated by step 302 in FIG. 3, via communication channel COM_INT, PD power supply 204a receives from PD power supplies 204b and 204c target output values $V_{TAR2}$ and $V_{TAR3}$.

FIG. 2, different from FIG. 1, has communication channel VDD_CON connected between PD power supply 204a and isolated converter 202. As demonstrated by step 304 in FIG. 3, communication channel VDD_CON can transmit feedback signal FB from PD power supply 204a to isolated converter 202, and feedback signal FB is generated based on target output values $V_{TAR1}$, $V_{TAR2}$ and $V_{TAR3}$.

As shown by step 306 in FIG. 3, isolated converter 202 changes or alters intermediate target value $V_{DD\text{-}TAR}$ based on feedback signal FB, making intermediate target value $V_{DD\text{-}TAR}$ have a predetermined relationship with target output values $V_{TAR1}$, $V_{TAR2}$ and $V_{TAR3}$. Isolated converter 202 regulates intermediate DC power source $V_{DD}$ at intermediate target value $V_{DD\text{-}TAR}$.

For example, through power delivery negotiation, PD power supplies 204a, 204b and 204c has set their target output values $V_{TAR1}$, $V_{TAR2}$ and $V_{TAR3}$ as 12V, 5V, and 5V, respectively. With the help of the information transmitted over communication channel COM_INT from PD power supplies 204b and 204c, power supplies 204a acknowledges all target output values $V_{TAR1}$, $V_{TAR2}$ and $V_{TAR3}$, and accordingly sends via communication channel VDD_CON feedback signal FB to make intermediate target value $V_{DD\text{-}TAR}$ equal to the maximum of target output values plus 1V. In this case that target output values $V_{TAR1}$, $V_{TAR2}$ and $V_{TAR3}$ are 12V, 5V, and 5V respectively, feedback signal FB causes intermediate target value $V_{DD\text{-}TAR}$ to be 13V accordingly, and isolated converter 202 regulates intermediate DC power source $V_{DD}$ at 13V.

According to another embodiment, target output values $V_{TAR1}$, $V_{TAR2}$ and $V_{TAR3}$ are still 12V, 5V, and 5V respectively, but PD power supplies 204b and 204c do not send power supply 204a information of target output values $V_{TAR2}$ and $V_{TAR3}$ directly. Instead, PD power supplies 204b and 204c send optimized input voltage values $V_{DD\text{-}OPT2}$ and $V_{DD\text{-}OPT3}$ to PD power supply 204a via communication channel COM_INT. Each PD power supply can derive its optimized input voltage value based on its own target output value and its own circuit structure. For example, PD power supplies 204a is a buck converter and PD power supply 204a can derive optimized input voltage value $V_{DD\text{-}OPT1}$ as target output value $V_{TAR1}$ plus 1V, which is 13V in this embodiment. Similarly, PD power supplies 204b and 204c can derive their optimized input voltage values $V_{DD\text{-}OPT2}$ and $V_{DD\text{-}OPT3}$ as 6V and 6V because their target output values $V_{TAR2}$ and $V_{TAR3}$ are 5V and 5V respectively. Knowing optimized input voltage values $V_{DD\text{-}OPT1}$, $V_{DD\text{-}OPT2}$ and $V_{DD\text{-}OPT3}$, PD power supply 204a feeds to communication channel VDD_CON feedback signal FB, causing intermediate target value $V_{DD\text{-}TAR}$ to be 13V, the maximum of optimized input voltage values $V_{DD\text{-}OPT1}$, $V_{DD\text{-}OPT2}$ and $V_{DD\text{-}OPT3}$. Therefore, isolated converter 202 regulates intermediate DC power source $V_{DD}$ at 13V.

According to the embodiments of the invention, intermediate target value $V_{DD\text{-}TAR}$ is not an unchanged value any more, but varies according to target output values $V_{TAR1}$, $V_{TAR2}$ and $V_{TAR3}$. Intermediate target value $V_{DD\text{-}TAR}$ could be optimized to be as close as to the maximum of target output values $V_{TAR1}$, $V_{TAR2}$ and $V_{TAR3}$, to improve the overall power conversion efficiency of power supply 200.

PD power supplies 204a, 204b and 204c are all buck converters in some embodiments, but are not limited to. In some embodiments, at least one of PD power supplies 204a, 204b and 204c is a buck-booster converter.

Figure 4:
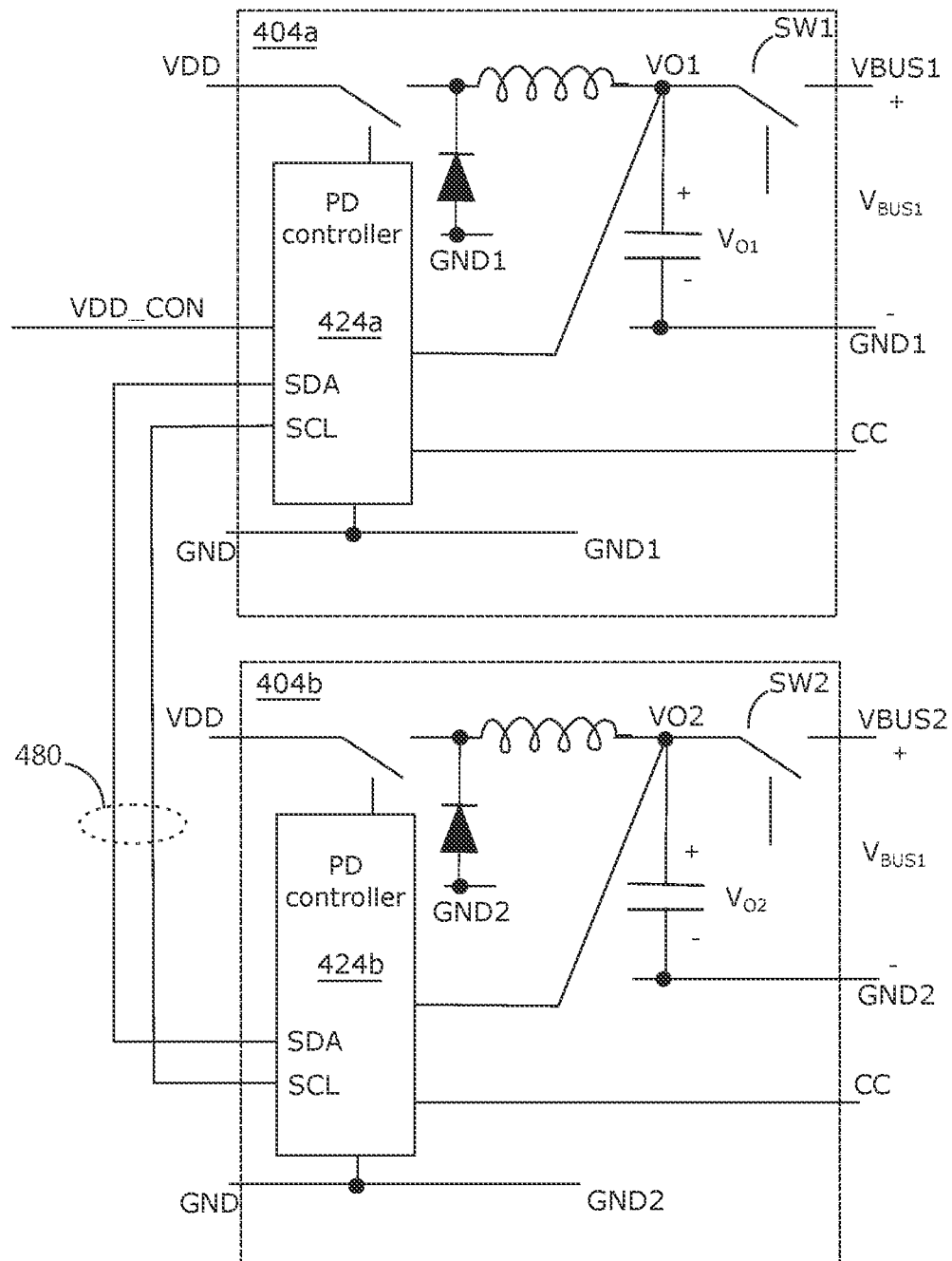
FIG. 4 demonstrates two PD power supplies.

FIG. 4 demonstrates PD power supplies 404a and 404b, examples of PD power supplies 204a and 204b respectively. PD power supplies 404a and 404b communicate with each other through I2C (inter-integrated circuit) bus 480, as communication channel COM_INT, where PD power supply 404a is a master, and power supply 404b a slave. Via serial data line SDA and serial clock line SCL, PD controller 424a of PD power supply 404a can request power supply 404b for information, and PD controller 424b of power supply 404b in response can send digital data to PD power supply 404a.

For example, PD controller 424a receives, via serial data line SDA and serial clock line SCL, information not limited to target output values of other PD power supplies. Via I2C bus 480, a PD power supply could provide to PD controller 424a information including its optimized input voltage value, its present output voltage value, and/or a duty cycle of one of its power switches.

In FIG. 4, both PD power supplies 404a and 404b are buck converters. PD power supply 404a, for instance, sets its target output value $V_{TAR1}$ after the negotiation over configuration channel CC. When PD power supply 404a regulates output voltage source $V_{O1}$ at about target output value $V_{TAR1}$, PD power supply 404a turns ON switch SW1, supplying power to DC power source $V_{BUS1}$.

Figure 5A:
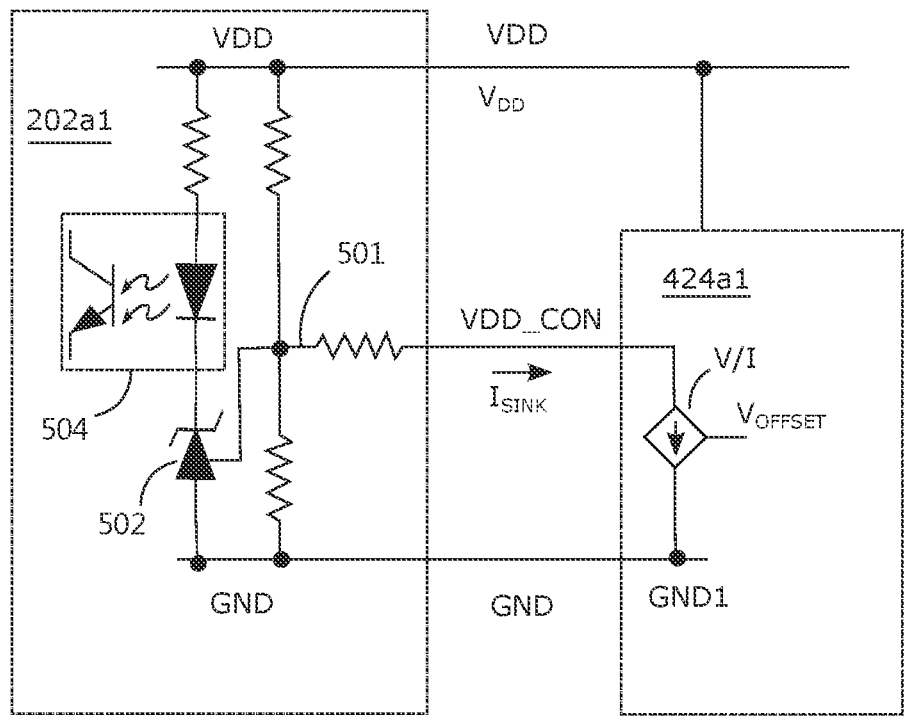
FIG. 5A demonstrates an isolated converter and a PD controller.

FIG. 5A demonstrates isolated converter 202a1 and PD controller 424a1, examples of isolated converter 202 in FIG. 2 and PD controller 424a in FIG. 4 respectively. In FIG. 5A, PD controller 424a1 controls voltage $V_{OFFSET}$, according to which voltage-to-current converter V/I provides sink current $I_{SINK}$ as a feedback signal over communication channel VDD_CON. Sink current $I_{SINK}$ can change or adjust intermediate target value $V_{DD\text{-}TAR}$, which in FIG. 5A is the voltage of intermediate DC power source $V_{DD}$ when input 501 of integrated circuit LT431 502 is at around 2.5V. The higher sink current $I_{SINK}$ the higher intermediate target value $V_{DD\text{-}TAR}$. In case that intermediate DC power source $V_{DD}$ exceeds intermediate target value $V_{DD\text{-}TAR}$, input 501 exceeds 2.5V, integrated circuit LT431 502 drives photocoupler 504 to control a compensation signal at the primary side, which accordingly reduces the power transferred from the primary side to the secondary side, and lowers both intermediate DC power source $V_{DD}$ and input 501 as well. Therefore, isolated converter 202 regulates intermediate DC power source $V_{DD}$ at around intermediate target value $V_{DD\text{-}TAR}$.

Figure 5B:
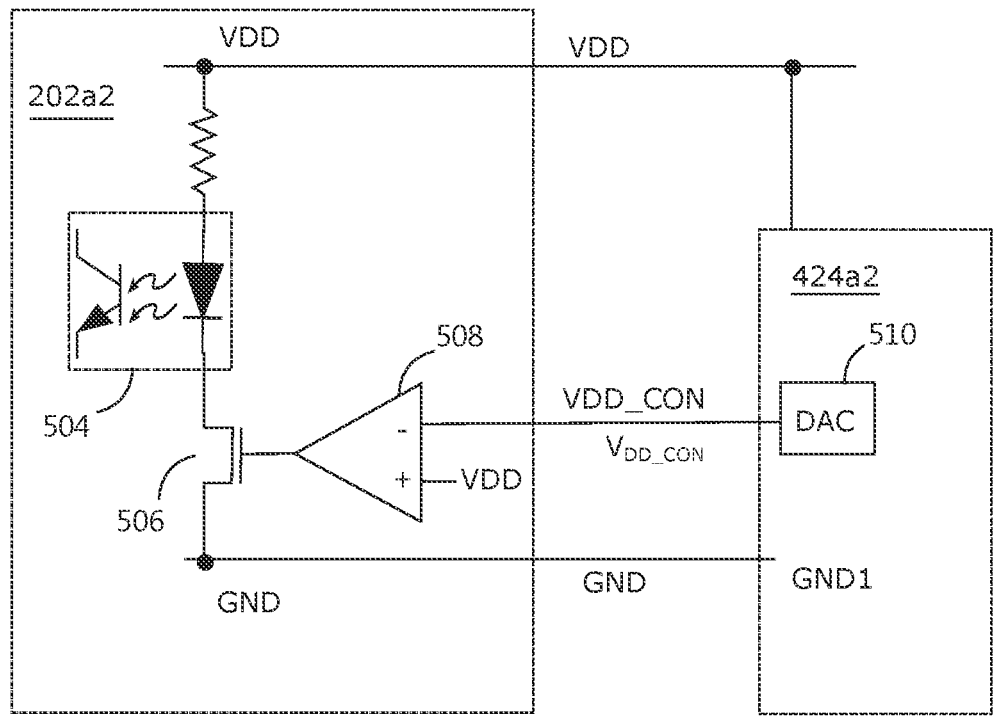
FIG. 5B demonstrates an isolated converter and a PD controller.

FIG. 5B demonstrates isolated converter 202a2 and PD controller 424a2, examples of isolated converter 202 in FIG. 2 and PD controller 424a in FIG. 4 respectively. In FIG. 5B, PD controller 424a2 has digital-to-analog converter (DAC) 510 provide at communication channel VDD_CON feedback voltage $V_{DD\_CON}$, a feedback signal which in this example also acts as intermediate target value $V_{DD\text{-}TAR}$. In case that intermediate DC power source $V_{DD}$ in FIG. 5B exceeds intermediate target value $V_{DD\text{-}TAR}$, amplifier 508 rises the gate voltage of NMOS transistor 506, which sinks more current through photo coupler 504, to control a compensation signal at the primary side and to accordingly reduce the power transferred from the primary side to the secondary side, lowering intermediate DC power source $V_{DD}$. Therefore, intermediate DC power source $V_{DD}$ is regulated at around intermediate target value $V_{DD\text{-}TAR}$.

According to some embodiments, intermediate target value $V_{DD\text{-}TAR}$ is determined according to all of target output values $V_{TAR1}$, $V_{TAR2}$, and $V_{TAR3}$. Intermediate target value $V_{DD\text{-}TAR}$ is set to be for instance the larger one between 5V and the maximum of target output values $V_{TAR1}$, $V_{TAR2}$ and $V_{TAR3}$ plus 1V. According to other embodiments, intermediate target value $V_{DD\text{-}TAR}$ is determined according to all of DC power source $V_{BUS1}$, $V_{BUS2}$ and $V_{BUS3}$, which could be, but not be necessary to be, regulated at target output values $V_{TAR1}$, $V_{TAR2}$ and $V_{TAR3}$ respectively. For example, intermediate target value $V_{DD\text{-}TAR}$ is set to be the maximum of DC power source $V_{BUS1}$, $V_{BUS2}$ and $V_{BUS3}$ plus 0.5V. Intermediate target value $V_{DD\text{-}TAR}$ in some embodiments of the invention is determined according to all of optimized input voltage values $V_{DD\text{-}OPT1}$, $V_{DD\text{-}OPT2}$ and $V_{DD\text{-}OPT3}$, each of which is in association with a corresponding target output value. Therefore, intermediate target value $V_{DD\text{-}TAR}$ is related to all of target output values $V_{TAR1}$, $V_{TAR2}$ and $V_{TAR3}$, but is not necessary to be determined by the maximum of target output values $V_{TAR1}$, $V_{TAR2}$ and $V_{TAR3}$.

Figure 6:
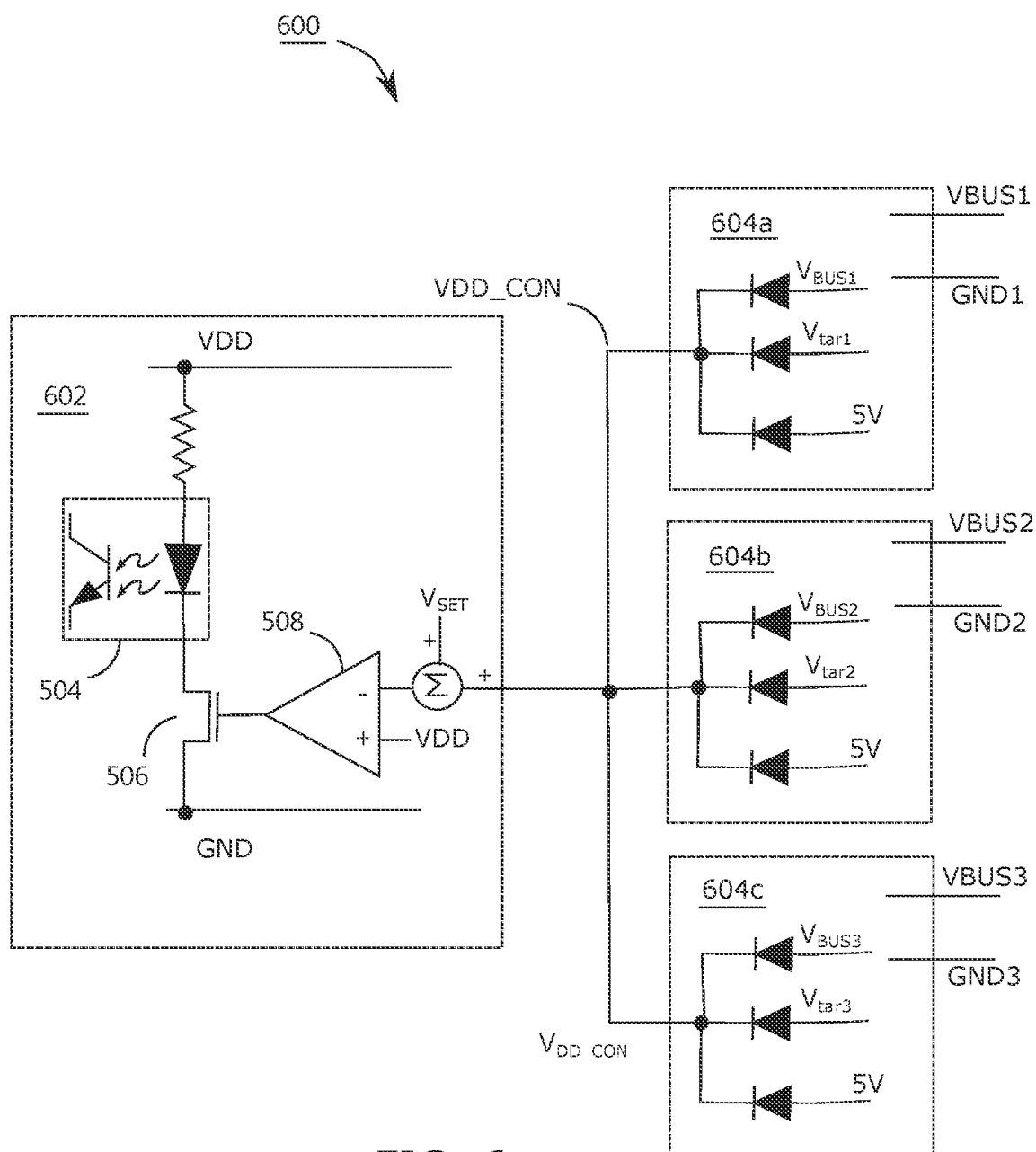
FIG. 6 shows another power supply according to embodiments of the invention.

In FIG. 2, PD power supplies 204a, 204b and 204c communicate with each other via communication channel COM_INT, using digital signals, and PD power supplies 204a accordingly provides over communication channel VDD_CON feedback signal FB to determine intermediate target value $V_{DD\text{-}TAR}$. The invention is not limited to however. FIG. 6 shows power supply 600 according to embodiments of the invention, including isolated converter 602, and PD power supplies 604a, 604b and 604c. FIGS. 6 and 2 have similar or the same aspects, whose details are omitted herein because they are comprehensible based on the teaching related to FIG. 2. Power supply 600 in FIG. 6 lacks communication channel COM_INT in FIG. 2. Unlike communication channel VDD_CON in FIG. 2 which only connects between isolated converter 202 and PD power supply 204a, communication channel VDD_CON in FIG. 6 connects not only isolated converter 602 and PD power supply 604a, but also PD power supplies 604b and 604c.

Based on the circuit shown in FIG. 6, it can be derived that intermediate target value $V_{DD\text{-}TAR}$ of isolated converter 602 equals to the summation of setting voltage $V_{SET}$ and feedback voltage $V_{DD\_CON}$ where feedback voltage $V_{DD\_CON}$ is the maximum among 5V, target output values $V_{TAR1}$, $V_{TAR2}$ and $V_{TAR3}$, and DC power sources $V_{BUS1}$, $V_{BUS2}$ and $V_{BUS3}$. Therefore, intermediate target value $V_{DD\text{-}TAR}$ of isolated converter 602 is set to relate to target output values $V_{TAR1}$, $V_{TAR2}$ and $V_{TAR3}$, possibly improving the power conversion efficiency of power supply 600.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply for converting an AC power source into DC power sources, comprising:
    an isolated converter converting the AC power source into an intermediate DC power source;
    non-isolated converters converting the intermediate DC power source into the DC power sources, and regulating the DC power sources at target output values respectively; and
    a communication channel connecting the isolated converter and one of the non-isolated converters, and transmitting a feedback signal in association with the target output values;
    wherein the isolated converter, in response to the feedback signal, regulates the intermediate DC power source at an intermediate target value determined according to the target output values;
    the target output values are for different output ports respectively;
    the DC power sources supply power through the different output ports respectively; and
    the feedback signal is generated according to a maximum of the target output values.

2. The power supply as claimed in claim 1, wherein the communication channel is a first channel, and the power supply has a second channel via which the non-isolated converters exchange digital information regarding to at least one of the target output values.

3. The power supply as claimed in claim 2, wherein the second channel is an inter-integrated circuit bus.

4. The power supply as claimed in claim 2, wherein the non-isolated converters include a master and a slave, and the first channel connects between the master and the isolated converter.

5. The power supply as claimed in claim 1, wherein the feedback signal is generated according to the DC power sources.

6. The power supply as claimed in claim 1, wherein the communication channel connects the isolated converter and the non-isolated converters.

7. The power supply as claimed in claim 1, wherein the target output values are voltages that the DC power sources are regulated to supply to the different output ports respectively.

8. A control method in use of a power supply, comprising:
converting an AC power source into an intermediate DC power source, wherein the intermediate DC power source is isolated from the AC power source;
converting the intermediate DC power source into DC power sources, and regulating the DC power sources at target output values respectively;
transmitting via a communication channel a feedback signal in association with the target output values; and
regulating, in response to the feedback signal, the intermediate DC power source at an intermediate target value determined according to the target output values;
wherein the target output values are for different output ports respectively;
the DC power sources supply power through the different output ports respectively; and
the feedback signal is generated according to a maximum of the target output values.

9. The control method as claimed in claim 8, wherein the communication channel is a first channel, and the control method comprises:
exchanging, via a second channel, digital information regarding to at least one of the target output values.

10. The control method as claimed in claim 9, wherein the second channel is an integrated circuit bus.

11. The control method as claimed in claim 8, wherein the feedback signal is generated according to the DC power sources.

12. The control method as claimed in claim 8, wherein an isolated converter converts the AC power source into the intermediate DC power source, non-isolated converters convert the intermediate DC power source into the DC power sources, and the communication channel connects the isolated converter and one of the non-isolated converters.

13. The control method as claimed in claim 12, wherein the communication channel connects the isolated converter and the non-isolated converters.

14. The control method as claimed in claim 8, wherein the target output values are voltages that the DC power sources are regulated to supply to the different output ports respectively.

* * * * *